US 6,677,947 B2

(12) United States Patent
Woodbury et al.

(10) Patent No.: US 6,677,947 B2
(45) Date of Patent: Jan. 13, 2004

(54) INCREMENTAL FRUSTUM-CACHE ACCELERATION OF LINE INTEGRALS FOR VOLUME RENDERING

(75) Inventors: Adam Woodbury, Emeryville, CA (US); Rick Sayre, Emeryville, CA (US); Tom Lokovic, Emeryville, CA (US); Tom Duff, Emeryville, CA (US)

(73) Assignee: Pixar, Emeryville, CA (US)

( * ) Notice: Subject to any disclaimer, the term of this patent is extended or adjusted under 35 U.S.C. 154(b) by 377 days.

(21) Appl. No.: 09/908,749

(22) Filed: Jul. 20, 2001

(65) Prior Publication Data

US 2003/0016219 A1 Jan. 23, 2003

(51) Int. Cl.$^7$ ............................................... G06T 15/00
(52) U.S. Cl. ..................................................... 345/426
(58) Field of Search ................................. 345/419, 420, 345/423, 424, 426, 427, 581, 582, 953

(56) References Cited

PUBLICATIONS

Sabella "A Rendering Algorithm for Visualizing 3D Scalar Fields" ACM 1988.*
Kajiya et al. "Ray Tracing Volume Densities" ACM 1984.*
Molnar et al. "PixelFlow: High–Speed Rendering Using Image Composition" ACM 1992.*
Cook et al. "The Reyes Image Rendering Architecture" ACM 1987.*
Duff "Compositing 3–D Rendered Images" ACM 1985.*

\* cited by examiner

*Primary Examiner*—Almis R. Jankus
(74) *Attorney, Agent, or Firm*—Townsend and Townsend and Crew LLP

(57) ABSTRACT

A method for rendering participating media effects is disclosed. At least one object having a surface is defined and a lattice, aligned with a camera, is also defined that encompasses the at least one object. A volumetric line integral is computed from the camera to lattice points in a neighborhood of a particular point on the surface of the object to obtain a value. The obtained value is filtered to obtain a volumetric line integral value for the particular point on the surface. Additionally, the set of values may be cached in memory and may be used in computing additional volumetric line integrals when applicable. The set of values determined for lattice points is filtered to determine the volumetric line integral value for a particular point on the surface.

24 Claims, 5 Drawing Sheets

$$\int_E^B = \int_E^A + \int_A^B$$

$$\int_E^B = \int_E^A + \int_A^B$$

INCREMENTAL FRUSTUM-CACHE ACCELERATION OF LINE INTEGRALS FOR VOLUME RENDERING

BACKGROUND OF THE INVENTION

1. Field of the Invention

The present invention relates generally to depiction of objects through the use of a computer and more specifically to the depiction of objects in computer animation. The present invention is also directed to a technique for efficiently computing effects of participating media, such as volumetric effects and atmospheric effects, in the context of a high-quality renderer, such as a Reyes-based renderer or a ray tracer.

2. Description of the Related Art

Traditional animation techniques allow the animator to create the apparent motion of animated characters, to be viewed by a viewer of the animation. The use of computers to simplify the animation process has provided many benefits to the traditional hand-drawn process. Computer animated scenes are well known in the prior art and have been used in many different capacities. Such animation is utilized in traditional movies, videos and online streaming of moving pictures, as well as interactive movies where the motion of characters is often initiated by a user.

In computer graphics, an image can be created from three-dimensional objects modeled within the computer. The process of transforming the three-dimensional object data within the computer into viewable images is referred to as rendering. Single still images may be rendered, or sequences of images may be rendered for an animation presentation.

Typically, rendering is performed by establishing a viewpoint of a viewing camera location 10 within an artificial "world space" containing the three-dimensional objects to be rendered. This is illustrated in FIG. 1. A "view plane," comprising a two-dimensional array of pixel regions, is defined between the viewing camera location and the objects to be rendered (also referred to herein as the "object scene") To render a given pixel for an image, a ray is cast from the viewing camera 10, through the pixel region of the view plane associated with that pixel, to intersect a surface of the object scene 12. Image data associated with the surface at that point or region is computed based on shading properties of the surface, such as color, texture and lighting characteristics. Multiple points, sampled from within a region of the object scene defined by the projection of the pixel region along the ray, may be used to compute the image data for that pixel (e.g., by applying a filtering function to the samples obtained over the pixel region). As a result of rendering, image data (e.g., RGB color data) is associated with each pixel. The pixel array of image data may be output to a display device, or stored for later viewing or further processing.

One effect that is often desirable in an animation scene is the depiction of atmospheric effects such as fog or smoke. A Reyes image rendering architecture is often used to provide fast high-quality rendering of a scene. (See, "The Reyes Image Rendering Architecture", R. L. Cook et al. Computer Graphics, Vol. 21, No. 4, 1987). While the Reyes algorithm is primarily designed to resolve visibility and appearance of surfaces, it also provides a framework for computing atmospheric effects such as fog or smoke. At each-surface point being shaded, illustrated in FIG. 1, the contribution of the atmosphere can be computed (usually as definite line integrals of scattering and absorption) and combined with the surface shading value. Computing these line integrals generally involves sampling many points along each line, and can be quite costly, in terms of time and computer processing.

Because atmospheric computations are performed once for every surface shading point, the cost of the atmospheric computations is tied to the surface shading rate. This means that even simple, low-detail fog, or other volumetric effect, can be very expensive if scene geometry is complex. Often the desired effects cannot be achieved in the timeframe needed and for reasonable requirements of cost and time. Thus, there is a need in the prior art to have an improved method for rendering atmospheric effects in computer graphics and animation.

SUMMARY OF THE INVENTION

The present invention is directed to methods for rendering participating media effects. This invention reduces the computational cost of volumetric effects such as fog, smoke and other volumetric effects as implemented in many high-quality renderers. It reduces the number of expensive line integrals that must be computed by caching a small set of integral solutions and determining new integrals from filtering of the cached ones. More generally, this invention provides a way to sample volumetric effects at a rate based on the nature of the atmospheric effect, rather than at a rate determined by the underlying rendering algorithm.

A method for rendering participating media effects is disclosed in one embodiment of the present invention. At least one object having a surface is defined and a lattice aligned with a camera is also defined that encompasses the at least one object. Volumetric line integrals are computed from the camera to lattice points in a neighborhood of a particular point on the surface of the object to obtain a set of values. The obtained set of values is filtered to obtain a volumetric line integral value for the particular point on the surface. Additionally, the set of values may be cached in memory and may be used in computing additional volumetric line integrals when applicable. The set of values determined for lattice points is filtered to determine the volumetric line integral value for a particular point on the surface.

The method for rendering volumetric effects is repeated for additional particular points until the volumetric effects are rendered for all selected points on the surface. The scale of the lattice is dependent on a level of detail required for the participating media effects. The method may be used to approximate volumetric effects or atmospheric effects between the camera and the at least one object.

Another embodiment of the present invention is directed to an apparatus for rendering volumetric effects in computer graphics. The apparatus includes means for providing at least one object having a surface and means for defining a lattice aligned with a camera encompassing the at least one object. Means for computing a volumetric line integral from the camera to lattice points in a neighborhood of a particular point on the surface of the object is used to obtain a set of values and means for filtering the set of values is used to obtain a volumetric line integral value for the particular point on the surface.

In another embodiment of the present invention, a computer program product is disclosed. A computer readable medium has a computer program code embodied therein for rendering volumetric effects, the program code configured to cause a processor to provide at least one object having a surface and define a lattice aligned with a camera encompassing the at least one object. The processor also computes a volumetric line integral from the camera to lattice points in a neighborhood of a particular point on the surface of the object to obtain a set of values. The processor then filters the set of values to obtain a volumetric line integral value for the particular point on the surface.

The above and other objects, features and advantages of the invention will become apparent from the following description of the preferred embodiment taken in conjunction with the accompanying drawings.

DESCRIPTION OF THE PREFERRED EMBODIMENTS

The present invention is directed to methods for rendering participating media effects in computer images and animation. These effects are often volumetric effects and more specifically atmospheric effects, such a fog, smoke, steam, clouds, haze and smog. While the prior art methods are able to provide rendering of the effects of participating media, often the desired effects could not be achieved in the timeframe needed and for reasonable requirements of cost and time.

The solution employed by the present invention is to perform atmospheric computations at whatever rate is most appropriate for the atmosphere, then filter to provide approximate answers at the desired surface points. The primary advantage of this technique is that the resolution of the atmosphere data can be set independent of the resolution of the surface tesselation. It can be set lower to speed up rendering, or higher to prevent aliasing of fine detail in the atmosphere.

Figure 1:
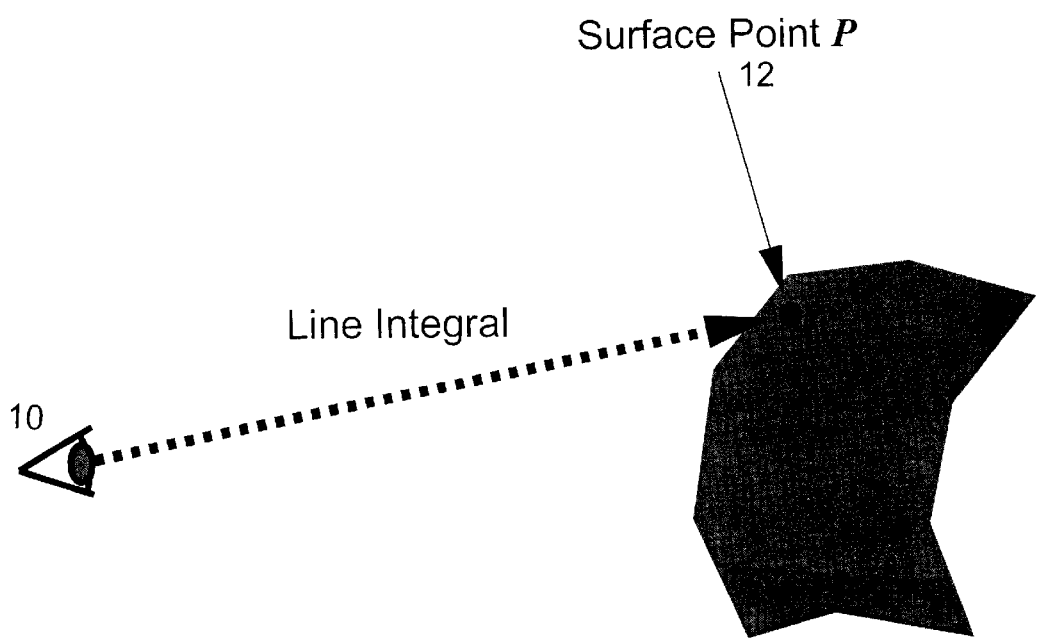
FIG. 1 illustrates a traditional method for computing an atmospheric line integral from a viewing camera location for a point P on the surface.
Figure 2:
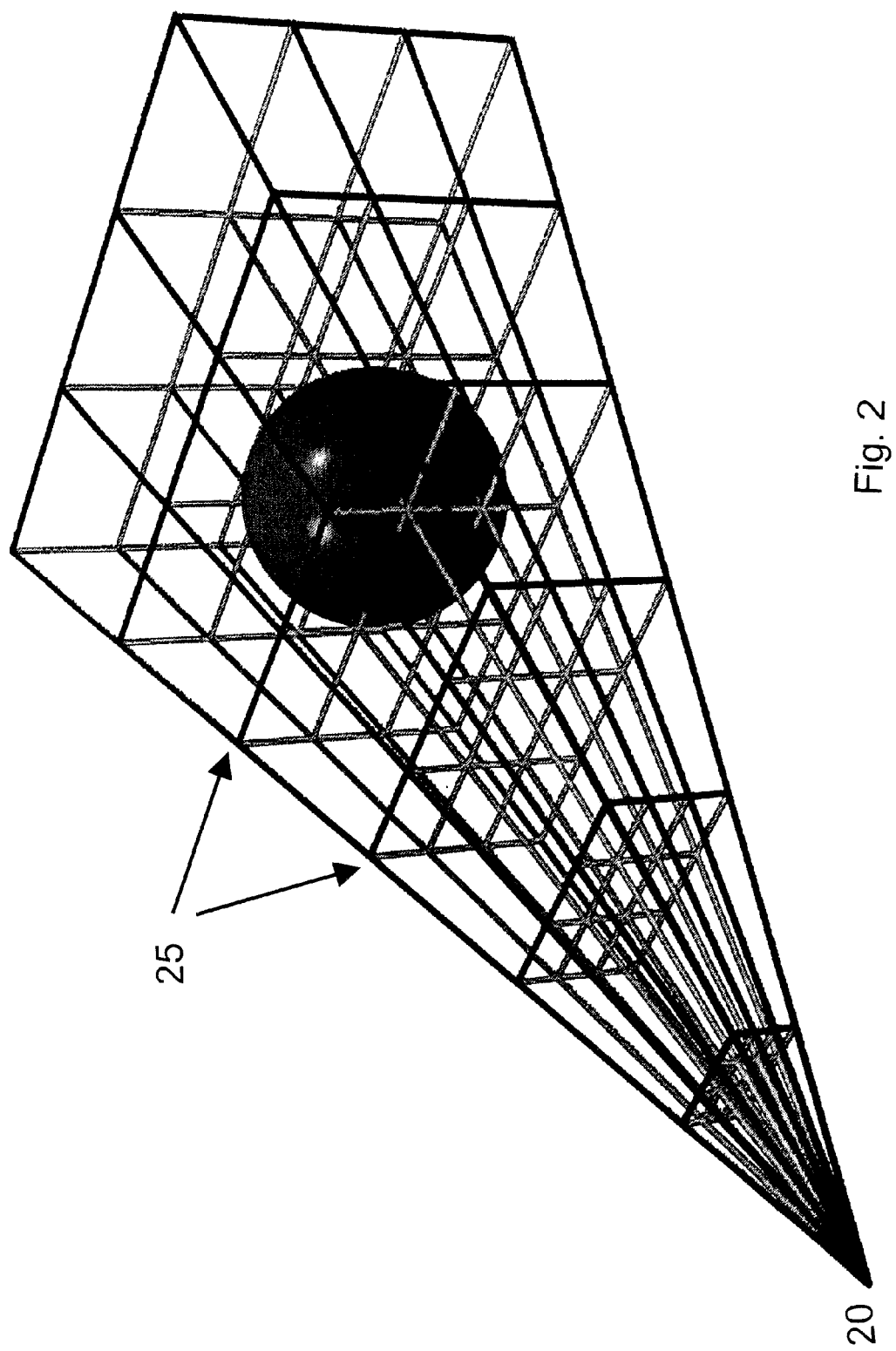
FIG. 2 illustrates an aspect of the present invention showing a 3d rectangular lattice aligned to the screen space of the camera.

The process is as follows: A 3 dimensional rectangular lattice is defined, axis-aligned in the camera's screen space. (See FIG. 2) For a perspective camera, the lattice appears in world space as a pyramidal grid, with its apex at the eye point 20. The size of cells 25 in this lattice is chosen based on the detail of the atmosphere and the desired quality of the output. Notably, its resolution is independent of the complexity of surfaces in the scene. Also, it is noted that while the lattice for a perspective camera is illustrated in FIG. 2, the invention is applicable to any projective camera, including orthographic cameras.

Figure 4:
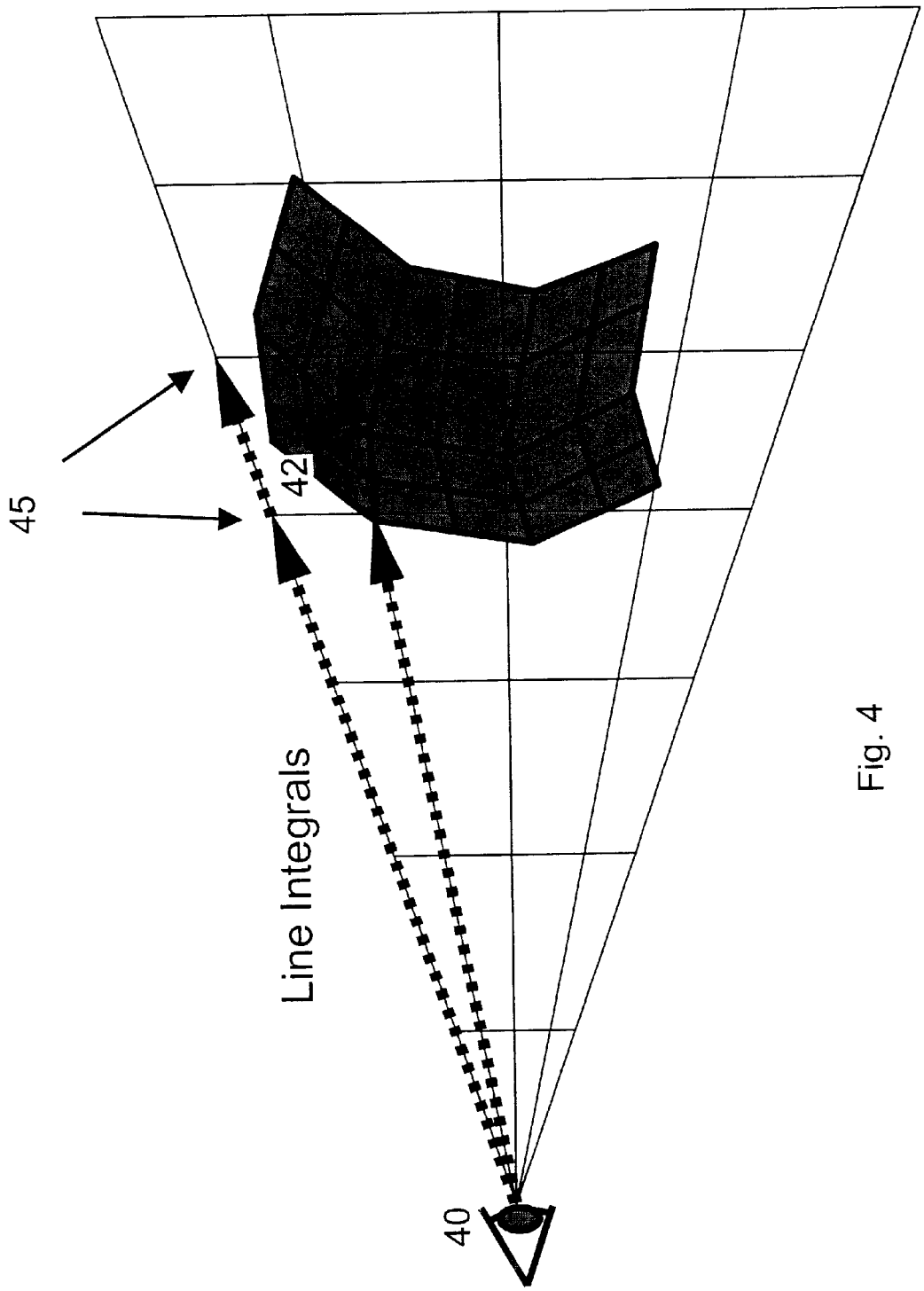
FIG. 4 illustrates the integration on the lattice formed in the present invention to produce filtered results for points not on the lattice.

Then, whenever a shader portion of the rendering mechanism needs to compute an atmospheric line integral from the eye 20 to a surface point P, we instead compute line integrals from the eye to a neighborhood of surrounding lattice points 25, and filter to get the result at P. This is shown in FIG. 4, with the point P 42 being located in the neighborhood of lattice points 45. In a preferred embodiment, the line integrals are interpolated to give an approximate result for points between lattice points 45. The integrals computed at lattice points are cached, so that they may be reused by consecutive lookups.

When the atmosphere has only low-frequency detail, a coarse atmosphere lattice may suffice. While every surface point must filter over a neighborhood of lattice points, many fewer line integrals are performed overall. Because the line integrals are much more expensive in terms of computation than the filtering, this results in significant time savings. Conversely, if the atmosphere has finer detail than surfaces in the scene, the atmosphere lattice can be made finer to guarantee that fine atmosphere details are not undersampled.

There are many techniques for volume rendering, but this invention primarily concerns volume rendering techniques which explicitly solve definite line integrals corresponding to ray segments passing through participating media. Such integrals are generally very expensive to compute, and much attention has gone into how to compute these integrals efficiently (adaptive sampling, etc). The present invention reduces the number of times that such integrals must be computed and is not dependent on the specific method used to arrive at the solutions of the integrals.

Most common rendering algorithms (including ray tracers and Reyes-type renderers) provide a natural place to insert volumetric contributions. In a ray tracer, volumetric effects are generally computed along each cast ray; in a Reyes-type renderer, volumetric effects are computed once for each surface micropolygon vertex. In each case, the rate at which volume effects are computed is tied to some sample rate inherent in the rendering algorithm.

This rate may not be appropriate for volumetric sampling: if it's too low, volumetric features may alias; if it's too high, the volumetric computations may take inordinately long. The technique of the present invention computes volumetric effects at whatever resolution is appropriate for the volumetric effects, while still remaining compatible with whatever underlying rendering algorithm is chosen. The present invention allows the user to adjust sample rates (and thus the computation cost) of volumetric effects independent of the rates for other elements in the scene (such as surfaces). It also reduces redundant work by caching.

Figure 3:
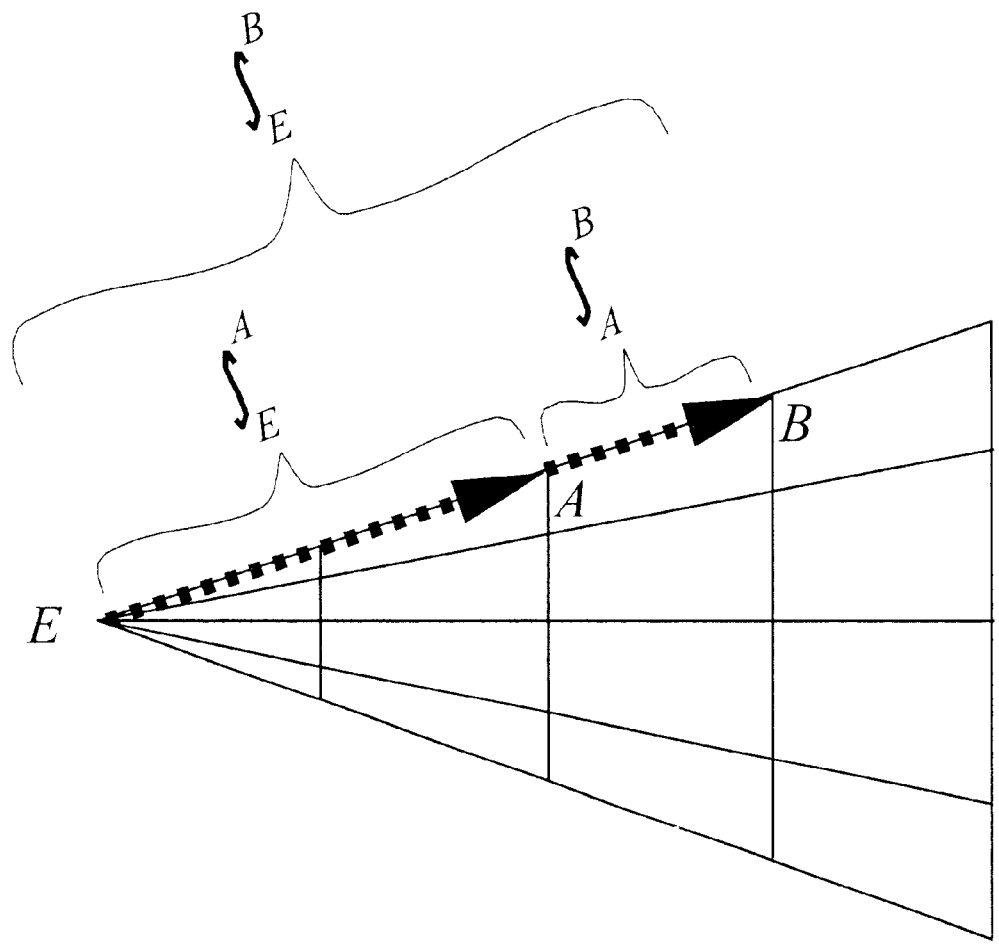
FIG. 3 illustrates the process of incremental computation of the present invention.

In the present invention, because the lattice is axis-aligned in screen space, each line integral passes through many other lattice points. If any of these points already has a value, the partial result can be used to compute the new integral much more cheaply. In particular, if EA=[integral from E to A] f(s)ds has already been computed, see FIG. 3, and EB= [integral from E to B] f(s)ds needs to be computed, then EB=EA+[integral from A to B] f(s)ds simply need to be computed, where the later is much cheaper from a computational perspective. The opportunity to use partial results in this way occurs frequently because the Reyes algorithm processes geometry in front-to-back order.

Additionally, the atmosphere lattice need not be rectangular. In a preferred embodiment, the "z" axis of the lattice is not "z" in camera space or screen space. Rather, it is "world-space distance from the eye". The resulting lattice is not rectangular, but still works as long as the filtering takes the shape into account. In fact, the lattice points also need not be uniformly spaced as long as the filtering process takes this into account.

Because lattice-point integrals are stored and reused, the present invention requires more storage than the prior art methods. Advantageously, surface points are generally processed in a spatially coherent manner, which means a least-recently used cache of the lattice data performs quite well. The maximum size of the cache can be specified by the user.

The process of the present invention can also be applied to other rendering algorithms, such as ray tracers. In a ray tracer, atmospheric computations are generally computed once for each cast ray, which may be prohibitive when the number of rays is large. The technique of the present invention can reduce that cost by performing atmospheric computations only at lattice points, and filtering for approximate results at each ray. It is noted that this only works for primary rays (those rays that originate at the eye point), but still provides some computational savings.

A particular application of the present invention is the reduction of the computational cost of volumetric effects. These volumetric effects may be atmospheric effects such as fog and smoke as implemented in many high-quality renderers. It reduces the number of expensive line integrals that must be computed by caching a small set of integral solutions and filtering the cached integrals to obtain new ones. More generally, this invention provides a way to sample volumetric effects at a rate based on the nature of the effect, rather than at a rate determined by the underlying rendering algorithm.

Specific features of the present invention include the following: Interpolation is used to interpolate definite line integrals from other definite line integrals computed at nearby lattice points, in one type of filtering. A cache of definite line integrals is lazily populated on the lattice and is available for subsequent use. Additionally, when a line integral from lattice point P to the eye E passes through some other lattice point Q, if Q already has a value, the integral from P to Q is simply computed and added to the value stored at Q.

The present invention is directed generally to rendering participating media effects. The effects of the participating media can be volumetric effects, where the rendering is performed taking into account the effects of the region between the object and the camera. In animation, these volumetric effects are often due to atmospheric effects that are being simulated in the animation scene. The atmospheric effects can include fog, smoke, clouds, haze, smog, etc. The present invention is also applicable to volumetric effects, such as fire and explosions, that are not considered to be atmospheric in the general sense. The present invention is not limited to rendering taking into the above effects and is limited only by the scope of the claims.

Figure 5:
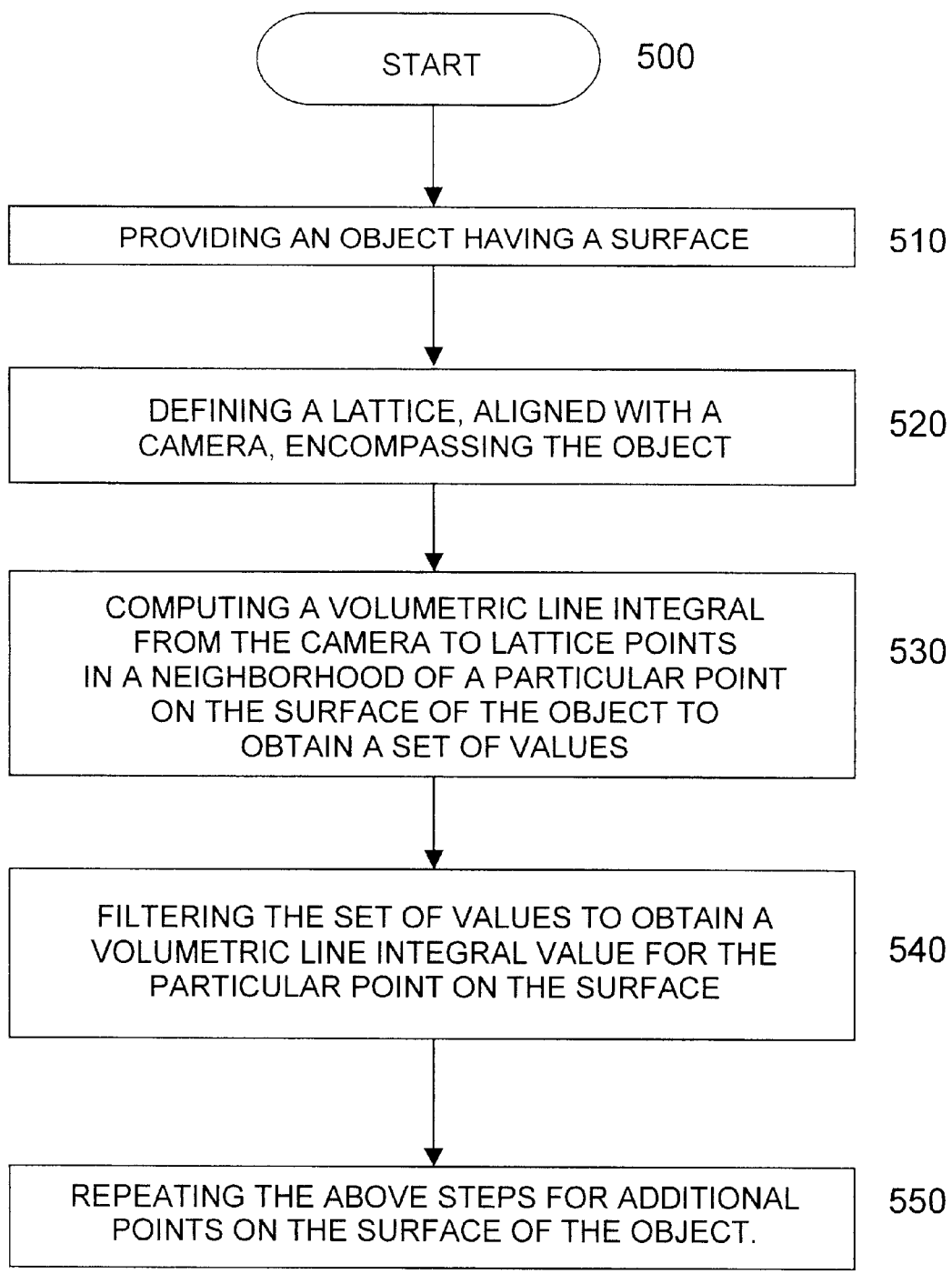
FIG. 5 illustrates the process of performing computations to approximate atmospheric effects.

The process of the present invention is illustrated in FIG. 5 as a flow chart. The process is initiated 500, and an object having a surface is defined in step 510. A lattice encompasses the object and is aligned with a camera that is defined in step 520. A volumetric line integral is computed from the camera to lattice points in a neighborhood of a particular point on the surface of the object to obtain a value in step 530. The obtained value is filtered to obtain a volumetric line integral value for the particular point on the surface in step 540. Finally, in step 550, the process is repeated for additional points on the surface of the object.

In addition, while the process and technique of the present invention has been discussed at length above, the present invention is not so limited. An apparatus configured to perform the rendering of participating media effects is also within the purview of the present invention. Additionally, a computer program product embodied on a computer readable medium for rendering participating media effects may also embody the present invention.

Although embodiments of the present invention have been described in detail, it will be understood that the present invention is not limited to the above-described embodiments, and various modifications in design may be made without departing from the spirit and scope of the invention defined in claims.

What is claimed is:

1. A method for rendering participating media effects comprising the steps of:
   providing at least one object having a surface;
   defining a lattice, aligned with a camera, encompassing the at least one object;
   computing a volumetric line integral from the camera to lattice points in a neighborhood of a particular point on the surface of the object to obtain a set of values; and
   filtering the set of values to obtain a volumetric line integral value for the particular point on the surface.

2. A method for rendering participating media effects according to claim 1 further comprising, after said computing step, caching the set of values in memory.

3. A method for rendering participating media effects according to claim 2 wherein in said computing step, a previously cached set of values are reviewed and used in computing the volumetric line integral when applicable.

4. A method for rendering participating media effects according to claim 1 wherein said step of filtering the set of values comprises interpolating between values of said set of values to determine the volumetric line integral value for the particular point on the surface.

5. A method for rendering participating media effects according to claim 1 wherein the process is repeated for additional particular points until the participating media effects are rendered for all selected points on said surface.

6. A method for rendering participating media effects according to claim 1, wherein said step of defining a lattice comprises defining the lattice with a scale that is dependent on a level of detail required for the participating media effects.

7. A method for rendering participating media effects according to claim 1 wherein the participating media effects rendered approximate volumetric effects between the camera and the at least one object.

8. A method for rendering participating media effects according to claim 1 wherein the participating media effects rendered approximate atmospheric effects between the camera and the at least one object.

9. An apparatus for rendering participating media effects in computer graphics comprising:
   means for providing at least one object having a surface;
   means for defining a lattice, aligned with a camera, encompassing the at least one object;
   means for computing a volumetric line integral from the camera to lattice points in a neighborhood of a particular point on the surface of the object to obtain a set of values; and
   means for filtering the set of values to obtain a volumetric line integral value for the particular point on the surface.

10. An apparatus for rendering participating media effects according to claim 9 further comprising, means for caching the set of values in memory.

11. An apparatus for rendering participating media effects according to claim 10 wherein said means for computing is configured to review a previously cached set of values and to use the previously cached set of values in computing the volumetric line integral when applicable.

12. An apparatus for rendering participating media effects according to claim 9 wherein said means for filtering the set of values comprises means for interpolating between values of said set of values to determine the volumetric line integral value for the particular point on the surface.

13. An apparatus for rendering participating media effects according to claim 9 wherein the apparatus is configured to repeatedly consider additional particular points until the participating media effects are rendered for all selected points on said surface.

14. An apparatus for rendering participating media effects according to claim 9, wherein said means for defining a lattice comprises means for defining the lattice with a scale that is dependent on a level of detail required for the participating media effects.

15. An apparatus for rendering participating media effects according to claim 9 wherein the apparatus renders participating media that approximate volumetric effects between the camera and the at least one object.

16. An apparatus for rendering participating media effects according to claim 9 wherein the apparatus renders participating media that approximate atmospheric effects between the camera and the at least one object.

17. A computer program product comprising:
a computer readable medium having a computer program code embodied therein for rendering participating media effects, said program code configured to cause a processor to:
provide at least one object having a surface;
define a lattice aligned with a camera encompassing the at least one object;
compute a volumetric line integral from the camera to lattice points in a neighborhood of a particular point on the surface of the object to obtain a set of values; and
filter the set of values to obtain a volumetric line integral value for the particular point on the surface.

18. A computer program product according to claim 17 further comprising, after said processor computes a volumetric line integral, the set of values is cached in memory.

19. A computer program product according to claim 18 wherein after said processor computes a volumetric line integral, a previously cached set of values are reviewed and used in computing the volumetric line integral when applicable.

20. A computer program product according to claim 17 wherein when said processor filters the set of values, the processors interpolates between values of said set of values to determine the volumetric line integral value for the particular point on the surface.

21. A computer program product according to claim 17 wherein said program code is configured to cause a processor to repeat the processor steps for additional particular points until the participating media effects are rendered for all selected points on said surface.

22. A computer program product according to claim 17, wherein when said processor defines a lattice, the processor defines the lattice with a scale that is dependent on a level of detail required for the participating media effects.

23. A computer program product according to claim 17 wherein the participating media effects rendered approximate volumetric effects between the camera and the at least one object.

24. A computer program product according to claim 17 wherein the participating media effects rendered approximate atmospheric effects between the camera and the at least one object.

* * * * *